United States Patent [19]

Beale et al.

[11] Patent Number: 5,148,066
[45] Date of Patent: Sep. 15, 1992

[54] LINEAR GENERATOR OR MOTOR WITH INTEGRAL MAGNETIC SPRING

[75] Inventors: William T. Beale; Robert W. Redlich, both of Athens, Ohio

[73] Assignee: Sunpower, Inc., Athens, Ohio

[21] Appl. No.: 752,270

[22] Filed: Aug. 19, 1991

[51] Int. Cl.⁵ .......................... F25B 9/14; F01B 29/10
[52] U.S. Cl. ....................................... 310/17; 60/520; 62/6
[58] Field of Search ................. 310/28, 5, 17; 60/520; 62/6

[56] References Cited

U.S. PATENT DOCUMENTS 4,792,346 12/1988 Sarcia ........................................ 62/6
4,937,481 6/1990 Vitale ..................................... 310/15

FOREIGN PATENT DOCUMENTS 0243351 12/1985 Japan ..................................... 62/520
2114673 8/1983 United Kingdom ................. 60/520

Primary Examiner—Steven L. Stephan
Assistant Examiner—Judson H. Jones
Attorney, Agent, or Firm—Frank H. Foster

[57] ABSTRACT

The invention relates to thermomechanical transducers drivingly linked to a linear motor or alternator, preferably a free piston Stirling engine in which the piston is drivingly linked to the field magnet of an alternator. There are symmetric and coaxial secondary magnets attached at opposite ends of the field magnet. The field magnet is polarized radially in one direction and the secondary magnets are polarized radially in the opposite direction. When the field magnet is displaced from a centered position, the secondary magnets have an oppositely directed axial net force exerted upon them. This causes a centering bias on the field magnet and therefore a centering of the piston in the Stirling engine or cooler.

A secondary effect produced by the magnetic spring of the secondary magnets is amplitude limiting during load reduction on the Stirling engine. Amplitude limiting is a result of increased spring constant of the magnetic spring past a certain amplitude. This increased spring constant results in greater energy storage in the magnetic spring and decreased efficiency due to decreased phase angle.

10 Claims, 3 Drawing Sheets

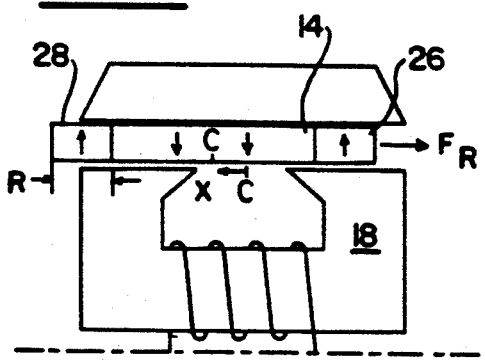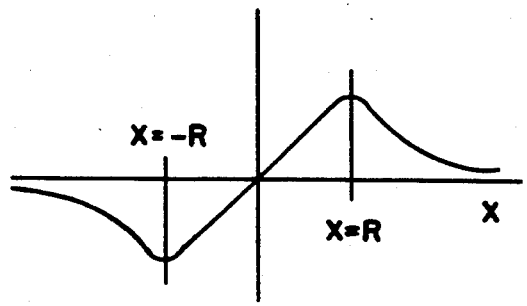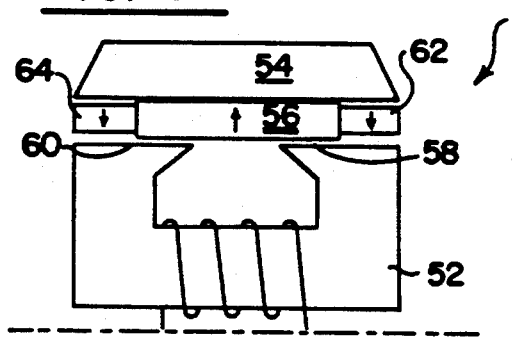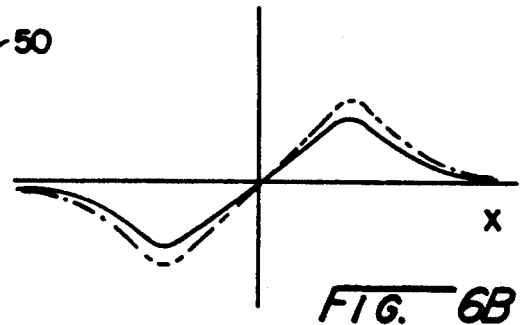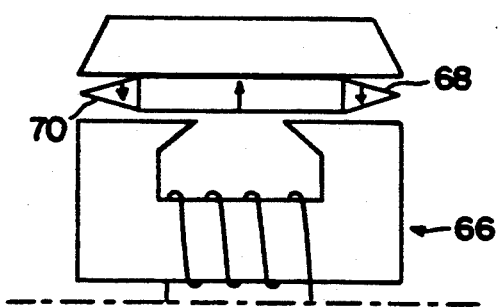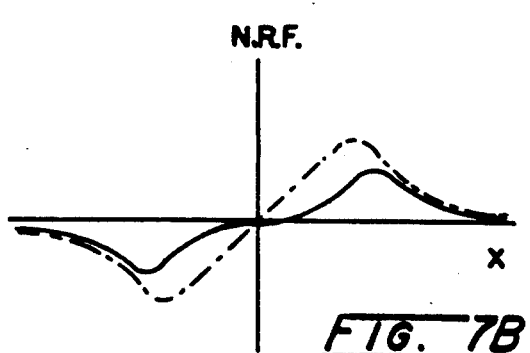

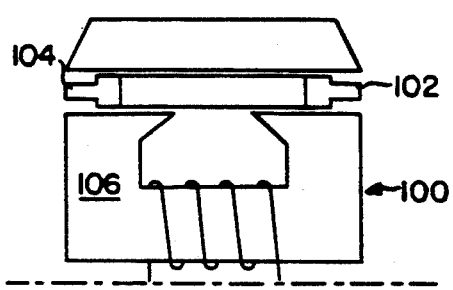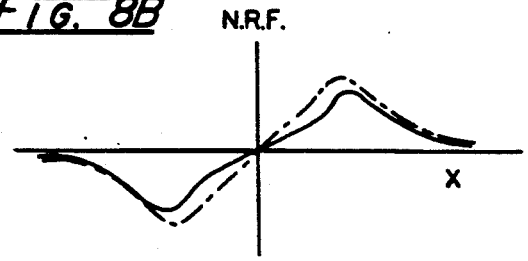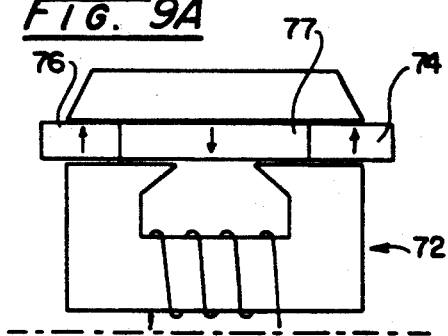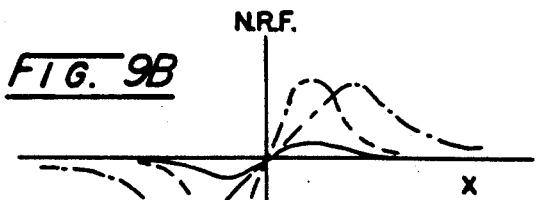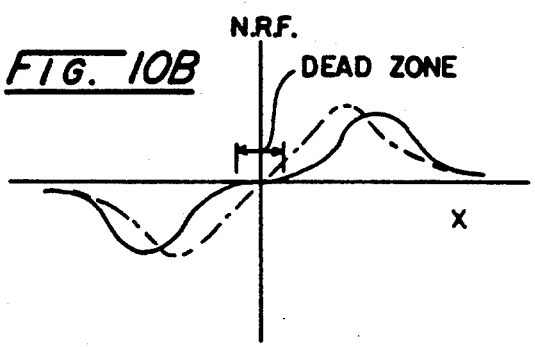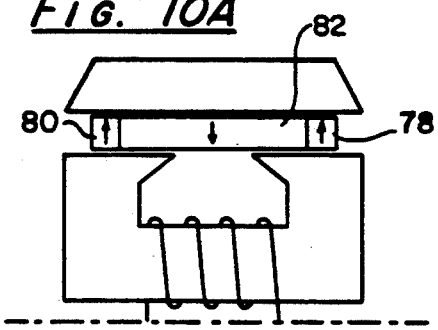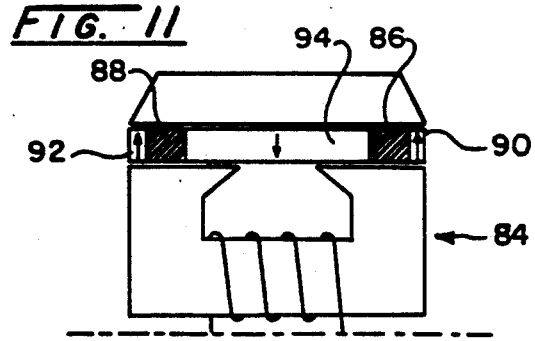

LINEAR GENERATOR OR MOTOR WITH INTEGRAL MAGNETIC SPRING

TECHNICAL FIELD

This invention relates to the field of Stirling cycle thermomechanical transducers and more specifically to free piston Stirling cycle engines and coolers which are preferably drivingly linked to a linear generator or motor.

BACKGROUND ART

Free piston Stirling machines typically comprise a piston and a displacer which are slidably mounted within a cylinder formed in a housing. The piston is drivingly linked to either a load or a driving mechanism.

Centering of the piston is required in free piston Stirling machines due to the unequal pressure forces acting on the piston in each half cycle of the piston's reciprocation. These unequal pressure forces cause the piston to gradually creep in one direction reducing the efficiency of the machine and possibly causing the piston to collide with another part of the machine.

Conventional means for piston centering consist of centerporting which causes the gas pressures on opposite ends of the piston to equalize at a predetermined position in the piston's reciprocation cycle. However, centerporting reduces the efficiency of the machine, and designing and making the centerporting apparatus increases the manufacturing expense of the machine.

Limiting the amplitude of the piston in a free piston Stirling machine is also desirable. If, for example, a load which is being driven by a Stirling engine at a steady state suddenly decreases, and therefore less power is required from the Stirling engine, the power output of the Stirling engine must be made to match that of the decreased load. If it is not, the energy which would have been coupled through the piston to the load is coupled to the piston only, causing the piston amplitude to increase and making collision of the piston with other engine parts likely.

Conventional methods for controlling Stirling engine power output include varying the thermal energy input to the engine. A variation in the thermal energy input to the Stirling engine usually requires too much time to have a significant effect on the engine before damage occurs thus reducing its effectiveness as a short term power control method.

Therefore, the need exists for a centering apparatus for a Stirling cycle thermomechanical transducer which does not significantly reduce efficiency and which can also be arranged to limit the increasing amplitude of the piston in the event of a reduced load.

BRIEF DISCLOSURE OF INVENTION

This invention relates to an improved thermomechanical transducer having a reciprocating piston which is drivingly linked to a main magnet. The piston is drivingly linked to the main magnet for reciprocating the main magnet along a reciprocation path through at least two gaps. The gaps are defined by at least two pairs of opposed pole faces, the gaps being formed as a part of a low reluctance flux loop. The main magnet is polarized across the gap. The improvement comprises a pair of secondary magnets which are mounted to the main magnet in the reciprocation path and symmetrically positioned on opposite sides of the main magnet. Both of the secondary magnets are polarized oppositely to the main magnet.

BRIEF DESCRIPTION OF DRAWINGS

FIG. 4 is a side view in section of the preferred embodiment.

FIG. 5 is a graphical illustration of net restoring force versus displacement.

FIG. 6A is a side view in section of an alternative embodiment and an accompanying graph FIG. 6B plotting net restoring force versus displacement.

FIG. 7A is a side view in section of an alternative embodiment and an accompanying graph FIG. 7B plotting net restoring force versus displacement.

FIG. 8A is a side view in section of an alternative embodiment and an accompanying graph FIG. 8B plotting net restoring force versus displacement.

FIG. 9A is a side view in section of an alternative embodiment and an accompanying graph FIG. 9B plotting net restoring force versus displacement.

FIG. 10A is a side view in section of an alternative embodiment and an accompanying graph FIG. 10B plotting net restoring force versus displacement.

FIG. 11 is a side view in section of an alternative embodiment.

Figure 1:
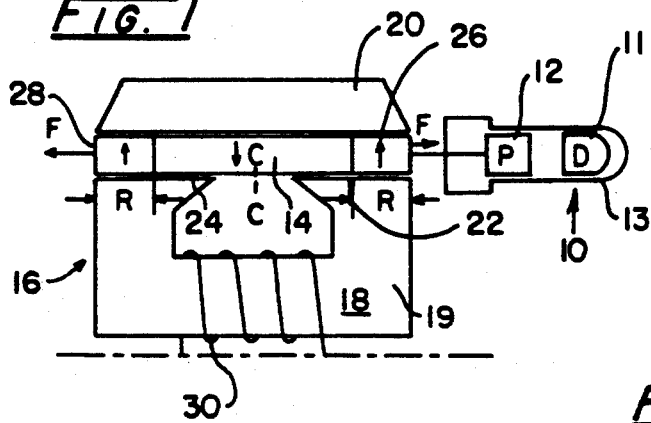
FIG. 1 is a side view in section of the preferred embodiment of the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

The preferred embodiment, illustrated in FIG. 1, comprises a Stirling engine 10 having a piston 12 and a displacer 11 slidably mounted within a housing 13 in the conventional manner and the piston 12 drivingly linked to a field magnet 14. The field magnet 14 is part of and reciprocates within an alternator 16 which also includes an armature 18. The field magnet 14 operates as a conventional field magnet in the alternator 16. The armature 18 has an inner U-shaped member 19 spaced from an outer wall 20 both of which are formed from a material having low reluctance magnetic properties. It also has an armature winding 30.

It is also possible to use the present invention in an apparatus comprising a Stirling cycle cooler driven by a linear motor since this apparatus can also benefit from piston centering. The linear motor would be illustrated like the alternator 16. It is also possible to reciprocate the field magnet in an armature gap which is not part of a system to produce or consume electricity as a linear generator or motor. For example, the generator or motor may be disconnected from an electrical source or load while still serving the centering and amplitude limiting functions. The winding could also be eliminated.

The armature 18 is generally cylindrical with its axis along the centerline of FIG. 1. The armature member 19 is generally U-shaped in cross section and has pole faces 22 and 24 formed at its outer periphery at opposite longitudinal ends of its U-shape. The wall 20 is cylindrical and coaxial with the armature member 19. The spaces between each pole face 22 and 24 and the alternator wall 20 define armature gaps. Between each pole face 22 and 24 and the wall 20 (within the gaps) there is a longitudinal reciprocation path for the field magnet 14.

The field magnet 14 is cylindrical and coaxial with the armature 18. It may be a series of discrete magnets circularly spaced around the centerline axis. The field magnet 14 has a pair of secondary magnets 26 and 28 mounted to it, positioned symmetrically on opposite ends of the field magnet 14 and within the reciprocation path of the field magnet 14. The secondary magnets 26 and 28 are cylindrical and coaxial with the field magnet 14 or are a series of discrete magnets spaced around the centerline. The secondary magnets 26 and 28 are polarized in the opposite direction to the field magnet 14 and are equal in thickness across the gap to the field magnet 14 in the preferred embodiment. It is not necessary that the secondary magnets be physically mounted to the field magnet. The magnets can be mounted for example to a common support. It is only important that they be mounted at the described location to move together as a unit.

The secondary magnets 26 and 28 have a length which makes their outermost edges flush with the outermost edges of the armature 18 when the field magnet 14 is at its centered position as illustrated in FIG. 1. The centered position of the field magnet 14 corresponds to the centered position of the piston 12.

During operation, the piston 12 of the free piston Stirling engine 10 reciprocates and drives the field magnet 14 in reciprocation within the gaps. This induces a magnetic flux through the armature 18 which induces a voltage across a winding 30 as in conventional linear generators. The secondary magnets, however, produce a magnetic spring effect as described below. The average spring force over each cycle of piston reciprocation counterbalances any average imbalance of gas forces on the piston which would otherwise cause piston creep.

Figure 2:
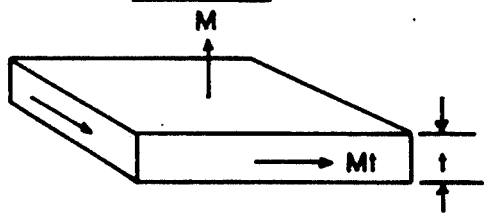
FIG. 2 is a view in perspective of a permanent magnet.

FIG. 2 illustrates a permanent magnet having a magnetization M in a direction perpendicular to its upper surface. The magnetization of this magnet is equivalent in all of its electrical effects, including the generation of force, to a ribbon of current around the outer peripheral edge of the magnet. The magnitude of the ribbon of current is equal to the product of the magnetization (M) and the magnet's thickness (t).

Figure 3A:
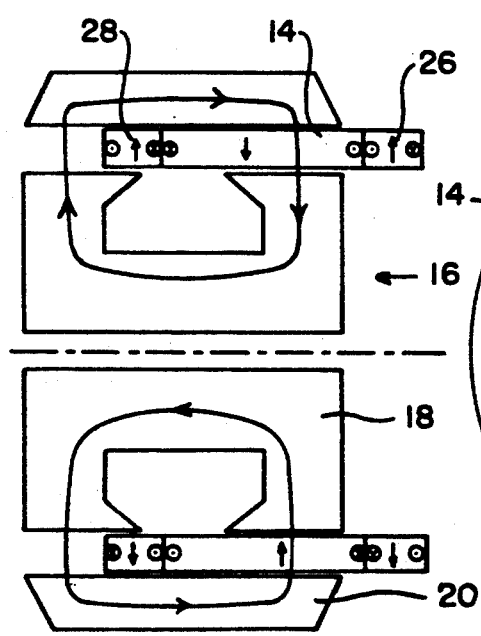
FIG. 3A is a side view in section with an accompanying FIG. 3B which is an end view in section of the preferred embodiment.

FIG. 3A is a side view in section of the preferred alternator 16 illustrating the directions of the ribbons of current. In this illustration the conventional encircled dot represents current toward the viewer and the encircled X represents current away from the viewer. Secondary magnets 26 and 28 have ribbons of current which have directions that are dictated by the "right-hand rule". That is, the outward radial magnetization in the secondary magnets 26 and 28 gives a ribbon of current which is directed perpendicular to and into the plane of FIG. 3A on the right sides of the secondary magnets 26 and 28, and a ribbon of current which is directed perpendicular to and out of the plane of FIG. 3A on the left sides of the secondary magnets 26 and 28.

Figure 3B:
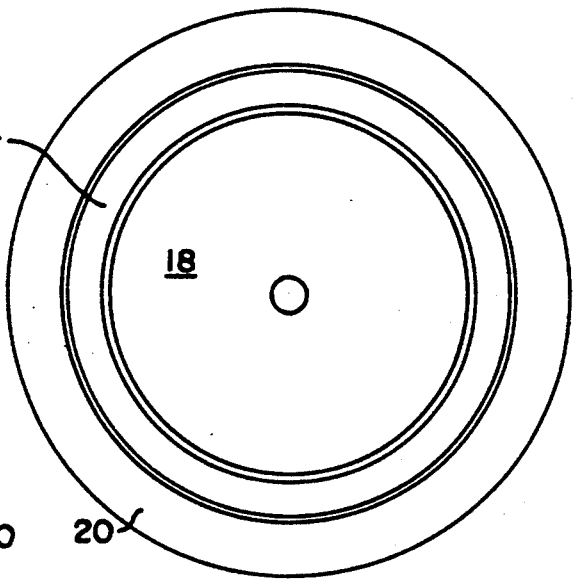

The end view of the alternator 16 in FIG. 3B shows that the preferred alternator embodiment is cylindrical with its axis lying along the centerline of the side view of FIG. 3A. Therefore, the ribbons of current on the secondary magnets 26 and 28 are directed circumferentially around the cylindrical secondary magnets 26 and 28. FIG. 3A also illustrates the flux path followed by radial lines of magnetic flux (shown by arrows) from a field magnet 14 through an armature 18. The combination of the magnetic flux across the gaps and the electrical effect of the ribbons of current within the gaps produces a force on each secondary magnet 26 and 28 which is perpendicular to both the circumferential ribbons of current and the radial magnetic flux. This force, which obeys Lorentz's force equation, produces an axial, outwardly directed force, F in FIG. 1, on each secondary magnet 26 and 28.

When the field magnet 14 is at its centered position, there is a net force on the secondary magnets 26 and 28 equal to zero since the axial, outwardly directed forces on the secondary magnets 26 and 28 are equal in magnitude and opposite in direction. As the field magnet 14 is driven away from its centered position, for example to the right as illustrated in FIG. 3A, the axial rightwardly directed force on the secondary magnet 26 decreases since a portion of it exits the gap and therefore is exposed to a reduced magnetic flux density. As the rightwardly directed force on the secondary magnet 26 decreases, the net force then increases from zero (at the centered position) to a leftwardly directed force. This net force directed leftwardly on the secondary magnets 26 and 28 is coupled to the field magnet 14, causing the field magnet 14 to be biased towards its centered position, resulting in a magnetic centering spring effect. The same centering effect occurs in both directions of field magnet 14 displacement from the centered position.

FIG. 4 shows field magnet 14 having secondary magnets 26 and 28 attached to its ends in the preferred manner and the field magnet 14 displaced from its centered position. The secondary magnets 26 and 28 have an axial length R. The significance of the length R is reflected in the graph of FIG. 5 which illustrates the relation between displacement X of the field magnet 14 from its centered position versus the net restoring force tending to force the field magnet 14 of FIG. 4 back to its centered position. It is clear from the graph of FIG. 5 that the maximum net restoring force occurs when the inward edge of one of the secondary magnets 26 or 28 is immediately outside of the extreme axial edge of armature 18 (where $X = +R$ or $-R$). Thus, the dimension R controls the range of the net restoring force since a smaller R will result in a smaller X necessary for maximum net restoring force and a larger R will result in a larger X necessary for maximum net restoring force.

An additional effect which secondary magnets can provide other than piston centering is piston amplitude limiting. It is known that in a conventional free piston Stirling engine driving a load at steady state, the piston and displacer have a fairly constant amplitude of reciprocation. If the load is reduced, the energy coupled to the piston must be reduced or the power previously coupled through the piston to the load will be used to drive the piston to greater amplitudes and possibly causing it to collide with another engine part.

In order to accomplish power limiting it is necessary that the piston amplitude excursions extend into the non-linear region so that its effective spring constant is a function of displacement. If the free piston Stirling engine is designed to be tuned to optimum output power under a design selected load, then any excursion of the piston beyond its design maximum amplitude will result in a change in the spring constant and consequently will detune the engine, reduce its efficiency and thus limit power output and piston amplitude. Of course if the engine is designed to operate at a detuned condition, then efficiency will be increased or decreased by a change in the spring constant, depending upon the side of the optimum resonance peak on which the engine was designed to operate.

Amplitude limiting is not significant if the amplitude excursions are confined to the generally linear net restoring force versus displacement curve in the central region of the graph of FIG. 5, and therefore are confined to the generally constant spring constant (k) in the central region. Power limiting is also negligible if the spring constant resulting from the spring magnets is negligible relative to the other springs, including the working gas, which are applying a spring force upon the piston.

The principles of power limiting may be described further. In a free piston Stirling engine, the displacer leads the piston (in their 360° reciprocating cycles) by some phase angle, and the power output of the Stirling engine is closely related to the phase angle. Rapidly changing the phase lead of the displacer relative to the piston away from the optimum phase angle limits the power output of the engine by decreasing the efficiency with which thermal energy is converted to mechanical energy.

If the secondary magnets of the present invention are shaped correctly, then at piston amplitudes higher than a specified value, the phase lead of the displacer will decrease. This results from the fact that the phase lead of the displacer is proportional to the natural frequency of the displacer divided by the natural frequency of the piston. For the phase lead of the displacer to decrease, either the natural frequency of the displacer must decrease or the natural frequency of the piston must increase. In the present invention the magnetic spring is linked to the piston, and consequently an increase in the natural frequency of the piston to decrease the phase angle is desirable for displacement limiting.

Since the natural frequency of the piston is proportional to the square root of the spring constant of the springs acting on the piston, an increased spring constant of the magnetic spring will result in an increased natural frequency of the piston. Spring constant is equal to the change in spring force with respect to the change in displacement, dF/dX, or stated more simply, spring constant is the slope of the curve in the net restoring force versus displacement graphs illustrated. Therefore, an increase in the slope of the net restoring force graph, and therefore an increase in the spring constant, will result in an increased natural frequency of the piston. In the following graphs, it is clear that when the slope of the net restoring force versus displacement graph is increasing, the natural frequency of the piston is also increasing.

The displacer system (the displacer and the springs affecting it) of the Stirling engine needs to have a Q which is high enough so that a change in the natural frequency of the piston results in a sufficient change in the phase angle. Q is the traditional Quality Factor which is a parameter indicating the energy storage capacity of the system compared to its energy dissipation rate. The value of Q is design limited, however, since designing for too high a value of Q may adversely affect heat exchange along the working gas flow path.

One alternative embodiment of the present invention is illustrated in FIG. 6A. An alternator 50 has an armature 52 and field magnet 56 similar in structure to the preferred embodiment. Two secondary magnets, 62 and 64 are attached at opposite ends of the field magnet 56 and are located within the reciprocation path. The secondary magnets 62 and 64 are polarized oppositely to the field magnet 56 and are equal to each other in their thickness across the gap and their axial length. However, the secondary magnets 62 and 64 have a thickness across the gap which is significantly less than the thickness across the gap of the field magnet 56. This smaller thickness results in a weakened centering force on the secondary magnets 62 and 64. The axially directed spring force on the secondary magnets 62 and 64 is directly proportional to the thickness of the secondary magnets 62 and 64. Therefore, a decrease in thickness results in a proportional decrease in maximum spring force exerted on the secondary magnets 62 and 64. This decreased net restoring (or centering) force is shown in the graph of FIG. 6B. The solid curve represents the embodiment of FIG. 6A which reaches a maximum that is less than that of the preferred embodiment, which is represented by the hyphenated curve.

Another alternative embodiment to the present invention is shown in FIG. 7A. FIG. 7A illustrates an alternator 66 which is similar in structure to the preferred embodiment except for the shape of the secondary magnets. Secondary magnets 68 and 70 are tapered in thickness across the gaps to have greater thickness at the more inwardly positioned portion than at the more outwardly positioned portion. The effect of the tapered secondary magnets 68 and 70 is that at small amplitudes the centering forces discussed above are small but as strong as necessary, whereas at larger amplitudes the centering forces are even greater, and the piston amplitude limiting effect described above becomes more significant.

The effect that the tapered secondary magnets 68 and 70 have on the net restoring force is shown in the graph of FIG. 7B. The graph of FIG. 7B shows the preferred embodiment curve hyphenated and the alternative embodiment of FIG. 7A curve as a solid curve. The tapered secondary magnets cause the net restoring force to be much less than the preferred embodiment's at low amplitude when only the narrow portion of the secondary magnets 68 and 70 exits the gap. With higher amplitude, however, a greater rate of increase of force with respect to increase of displacement results due to an ever increasing thickness of secondary magnets 68 and 70 exiting the gap. The rate of change of force with respect to change of displacement is the slope of the graph. As discussed above, the slope of the graph is equal to the spring constant, k and the natural frequency of the piston increases with increasing slope of the net restoring force graph. Therefore, as the slope of the graph of FIG. 7B increases, the natural frequency of the piston increases and the amplitude of the piston decreases as described above.

FIG. 8A illustrates another alternative embodiment of the present invention and shows an alternator 100 which is similar in structure to the preferred embodiment except for the shape of the secondary magnets in the preferred embodiment. Secondary magnets 102 and 104 have a two-stage shape which is greater in thickness across the gaps at the more inwardly positioned portion than at the more outwardly positioned portion. The two-thickness secondary magnets 102 and 104 differ from the tapered thickness secondary magnets 68 and 70 of FIG. 7A. These two-thickness magnets provide a sufficient magnetic spring centering force at small amplitudes and a piston amplitude limiting effect as described above at a specified greater amplitude. The specified amplitude is where the outer edge of the thickest portion of the secondary magnets 102 and 104 reaches the outer edge of the armature 106 and begins to extend out of the gaps. The graph of FIG. 8B illustrates the increasing slope at a specified amplitude, resulting in increased piston natural frequency and piston amplitude limiting as discussed above. Of course, it is possible to have more than two thicknesses to have more than two positions of increasing slope.

FIG. 9A illustrates another alternative embodiment illustrating an alternator 72 having the preferred structure except for the positions of secondary magnets 74 and 76 when field magnet 77 is centered. The secondary magnets 74 and 76 are of equal length to each other but are of a length which causes them to extend outward of the preferred flush alignment with the outer edge of the armature when the field magnet 77 is at its centered position. The graph of FIG. 9B shows the resulting force versus displacement plot in solid line as compared to the preferred embodiment which is shown by the hyphenated curve on the graph.

FIG. 10A illustrates another alternative embodiment similar in principal to the alternative embodiment illustrated in FIG. 9A and having a structure similar to the preferred embodiment except for the positions of secondary magnets 78 and 80 when field magnet 82 is centered. These secondary magnets 78 and 80 are identical in length and in thickness to each other but their outer edges are positioned inward of the flush mounted position at the outer edges of the armature when the field magnet 82 is at its centered position. This structure causes a "dead zone" in the net restoring force versus displacement graph of FIG. 10B. The net restoring force causing the field magnet 82 to be biased toward its centered position is very small and considered negligible when the outer edges of the secondary magnets 78 and 80 are within the outer edges of the armature and until the outer edge of one of the secondary magnets 78 or 80 reaches the outer edge of the armature and begins to extend out of its gap. Therefore, the field magnet 82 could center at practically any position in which the outer edges of the secondary magnets 78 and 80 were within the outer edges of the armature. The graph of FIG. 10B shows the curve of the preferred embodiment hyphenated with the curve of the embodiment of FIG. 10A shown as a solid curve. The dead zone is the portion of the graph where negligible net restoring force occurs for small displacements from the center.

FIG. 11 shows an alternator 84 having similar structure to the preferred embodiment except for the placement of a high reluctance insulator 86 between secondary magnet 90 and a field magnet 94 and a high reluctance insulator 88 between secondary magnet 92 and the field magnet 94 in the reciprocation path. As in the preferred embodiment, the opposite extreme edges of the secondary magnets are flush with the pole pieces when the field magnet is centered as illustrated in FIG. 11. The range of the magnetic centering spring is affected by the axial thickness of the insulators. For example, the thicker the insulators are, the lower the range of the magnetic spring. This embodiment provides the characteristic force versus displacement illustrated in dashed lines in FIG. 9B.

Stirling cycle machines and linear generator/motors are energy transducing devices and, accordingly, the above embodiments are understood to be able to transduce energy from one form to another and operated in a reverse cycle, to transduce in the reverse. For example, the preferred embodiment free piston Stirling engine drivingly linked to a linear generator (an apparatus to which thermal energy is applied and from which electrical energy is retrieved) may be operated, in most circumstances, by applying electrical energy to the generator and retrieving thermal energy from the engine. This is now a linear motor driving a free piston Stirling cooler. Thus, the concepts of the present invention may be applied to both.

While certain preferred embodiments of the present invention have been disclosed in detail, it is to be understood that various modifications may be adopted without departing from the spirit of the invention or scope of the following claims.

I claim:

1. An improved thermomechanical transducer having a reciprocating piston drivingly linked to a main magnet for reciprocating the main magnet along a reciprocation, path through at least two gaps defined by at least two pairs of opposed pole faces, the gaps being formed in a low reluctance flux loop, the main magnet being polarized across the gap, the improvement comprising a pair of secondary magnets mounted to the main magnet in the reciprocation path and symmetrically positioned on opposite sides of the main magnet, the secondary magnets both polarized oppositely to the main magnet.

2. A thermomechanical transducer in accordance with claim 1 wherein the secondary magnets are positioned with the opposite outer end of each secondary magnet spaced a distance from each other which is substantially equal to the reciprocation path length within the gaps so said ends are in flush alignment with the ends of the gaps when the piston is at its designed center of reciprocation.

3. A thermomechanical transducer in accordance with claim 1 or 2 wherein the secondary magnets are thinner in the direction across the gaps than the main magnet.

4. A thermomechanical transducer in accordance with claim 2 wherein the secondary magnets are shaped to have a greater thickness in the direction across the gaps at the more inwardly positioned portion than at the more outwardly positioned portion.

5. A thermomechanical transducer in accordance with claim 4 wherein each secondary magnet is shaped to have two thicknesses, a primary thickness at its outer extremity which is substantially thinner than a secondary thickness at its inner extremity.

6. A thermomechanical transducer in accordance with claim 4 wherein the secondary magnets are tapered in thickness in the direction across the gaps.

7. A thermomechanical transducer in accordance with claim 1 or 2 or 4 wherein the thermomechanical transducer comprises a free piston Stirling engine drivingly linked to an alternator in which said main magnet is an alternator field magnet and said low reluctance flux loop is a portion of an alternator armature.

8. The thermomechanical transducer in accordance with claim 1 or 2 wherein a high reluctance spacer separates the secondary magnets from the main magnet.

9. A thermomechanical transducer in accordance with claim 1 wherein the secondary magnets are positioned with the opposite outer end of each secondary magnet spaced a distance from each other which is substantially greater than the reciprocation path length within the gaps so the ends of the secondary magnets extend outward of the ends of the gaps when the piston is at its designed center of reciprocation.

10. A thermomechanical transducer in accordance with claim 1 wherein the secondary magnets are positioned with the opposite outer end of each secondary magnet spaced a distance from each other which is substantially less than the reciprocation path length within the gaps so the ends of the secondary magnets extend inward of the ends of the gaps when the piston is at its designed center of reciprocation.

* * * * *